Patented Aug. 16, 1927.

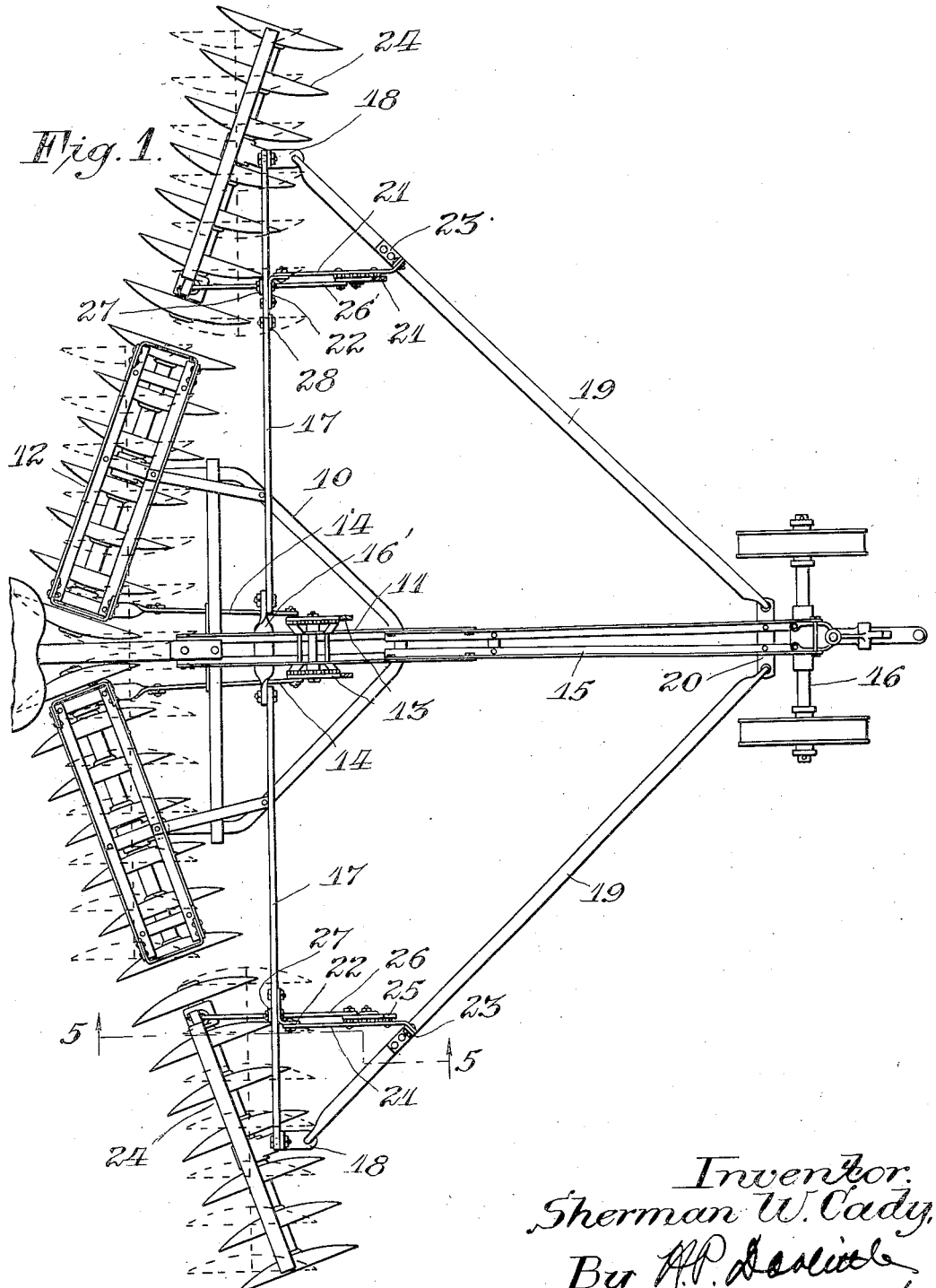

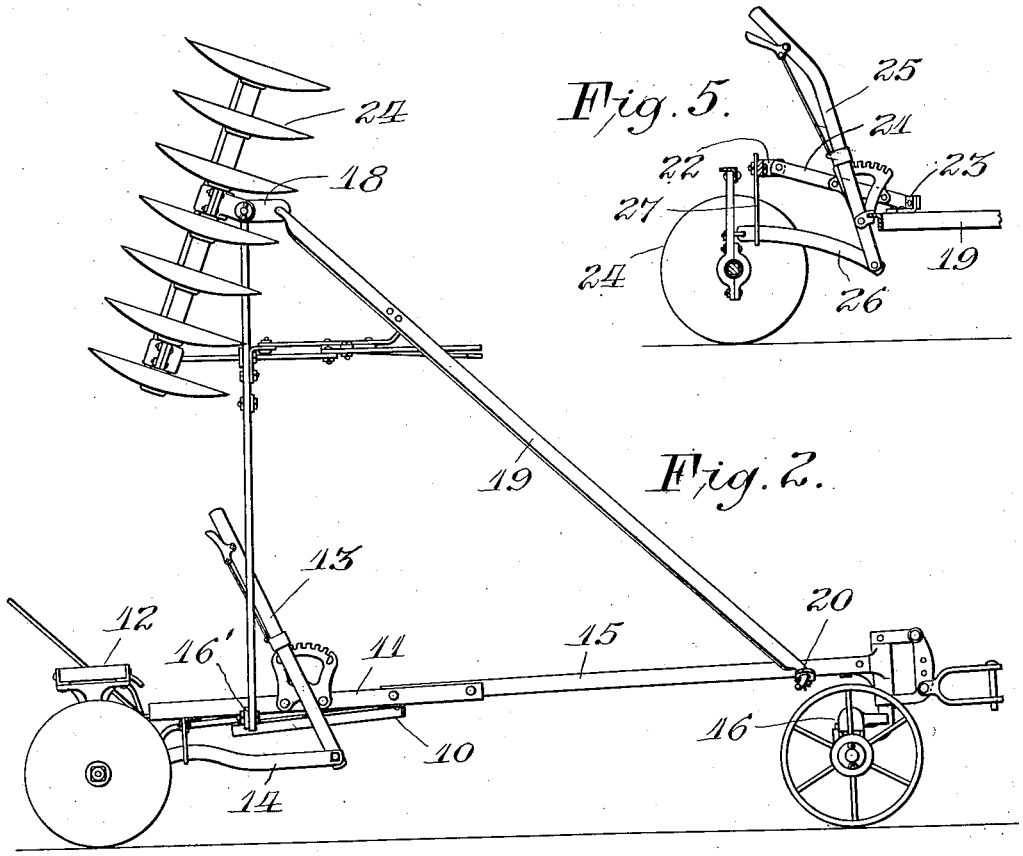
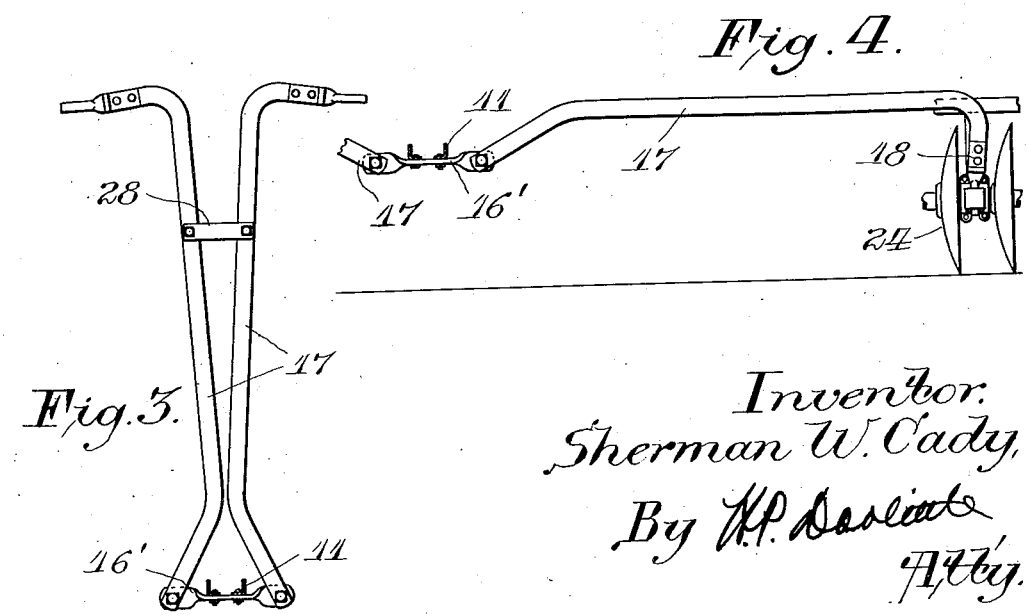

1,639,451

UNITED STATES PATENT OFFICE.

SHERMAN W. CADY, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY.

DISK HARROW.

Application filed April 17, 1922. Serial No. 553,763.

The present invention relates to disk harrows and is more specifically directed to means for increasing the working capacity of disk harrows of the ordinary two-gang type. The principal objects of the invention are to widen the harrow by means of auxiliary disk gangs positioned beyond the outer ends of the harrow gangs and practically forming extensions thereof and to so construct and combine the auxiliary gangs with the harrow as to provide the degree of flexibility necessary to permit the several gangs to accommodate themselves to uneven ground and also permit the auxiliary gangs to be raised into inoperative position above the harrow for purposes of transport. With these main as well as other minor objects in view, the invention consists of the organization, details of construction and parts, or the equivalents thereof, hereinafter described and claimed.

Having reference to the drawings—

Fig. 1 is a plan view of a harrow with which the wide spread attachment has been combined;

Fig. 2 is a side elevation showing the auxiliary frames in raised position;

Fig. 3 is a detail front view showing the auxiliary frame bars in raised position;

Fig. 4 is a similar view showing the bars lowered; and

Fig. 5 is a detail view on the line 5—5 of Fig. 1 showing the adjusting means for one of the auxiliary gangs.

The invention is illustrated in combination with a disk harrow of well known type comprising a frame 10, having the central forwardly extending portion or draft frame 11 and the two disk gangs 12 pivotally attached to the frame and controlled by means of the adjusting levers 13 which are pivoted to the draft frame 11 and connected to the inner ends of the gangs by links 14 in the usual manner, it being understood that the gangs may be swung from straight or non-working position indicated in dotted lines in Fig. 1 to the angled or working position shown in full lines, by means of the levers 13.

In order to obtain the novel structure comprising my invention with the harrow above described, the draft frame or stub tongue 11 is extended by means such as a pair of bars 15 secured to the front end of the stub tongue and extending a substantial distance in advance thereof. Usually, the fore truck 16 which is used to support the stub tongue is detached therefrom and attached to the forward end of the extended draft frame members 15 as shown in Figs. 1 and 2. The original stub tongue 11 together with extension 15 thus form a central forwardly projecting portion of the harrow frame to which a rear hinge strap 16' is secured near the rear end of the draft frame. This strap has its ends twisted into a vertical plane and perforated to form pivotal or hinged connections for the horizontally extending auxiliary frame members 17 which extend laterally at right angles from the central draft frame to a point well beyond the outer ends of the disk gangs on the harrow. The bars 17 have angular bracket plates 18 secured to their ends in which are pivotally received the ends of bars 19 which diverge forwardly from the bars 17 and are pivotally connected at their forward ends to a cross strap or plate 20 fixed near the forward end of the draft frame 15. Near their outer ends, the bars 17 and 19 are connected by a cross link 21 which is attached to the respective bars by means of angle brackets 22 and 23 to which the ends of the links 21 are pivoted. There is thus provided a floating auxiliary frame composed of bars 17 and 19 projecting laterally from each side of the harrow frame and, to the outer end of each auxiliary frame an auxiliary disk gang 24 is pivoted on a vertical axis and adjustably connected to the auxiliary frame by means of a lever 25 mounted on link 21 and connected to the inner end of the auxiliary gang by link 26 which passes through a supporting stirrup 27, (Fig. 5). As best shown in Fig. 1, each auxiliary gang is positioned beyond but adjacent the outer end of one of the disk gangs and is so related thereto that it forms what amounts to an extension of the harrow gang when both the harrow gang and auxiliary gang are in angled or working position, but the construction and arrangement of the auxiliary frames and gangs is such that each auxiliary frame is free to rise and fall independently, thus enabling the entire organization to flex in a manner to conform to the inequalities of the ground.

For purposes of transport, the auxiliary frames may be swung into substantially upright position as shown in Fig. 2 and the frames may be secured in such position by any suitable means such as a connecting strap 28 shown in Fig. 3. The main auxiliary bars 17 are preferably arched as shown in Figs. 3 and 4 in order that they may be able to rise and fall during operation of the harrow without interference with the main frame and also so that they may be substantially in contact when in upright position to facilitate locking them together for transport purposes.

With a machine construction as described, the ordinary harrow is doubled in width and is capable of operating efficiently over uneven ground and, when the auxiliary frames are elevated, can be transported over roads and through ordinary farm gates with the same facility as the ordinary harrow.

The construction described exemplifies one form which my invention may take and modifications thereof are possible within the scope of the following claims.

I claim as my invention:

1. The combination with a harrow comprising a frame and a pair of angularly adjustable disk gangs, of an auxiliary angularly adjustable gang positioned beyond and ahead of the outer end of each disk gang and connected to the frame for independent vertical floating movements during normal operation of the harrow.

2. The combination with a harrow comprising a rigid frame and a pair of angularly adjustable disk gangs, of an auxiliary angularly adjustable gang positioned adjacent the outer end of each disk gang and connected to the harrow frame by rigid horizontally extending members pivotally attached to the frame.

3. The combination with a harrow comprising a frame having a central forwardly extending portion and a pair of angularly adjustable disk gangs, of an auxiliary angularly adjustable gang positioned adjacent the outer end of each disk gang and connected to the central frame portion by rigid horizontally extending diverging bars pivotally attached near the front and rear ends of said central portion.

4. The combination with a harrow comprising a frame and a pair of angularly adjustable disk gangs, of an auxiliary angularly adjustable gang positioned adjacent the outer end of each disk gang, a floating frame connecting each auxiliary gang to the harrow frame and adapted to be swung upwardly over the harrow frame, and means for adjusting each auxiliary gang about its vertical axis.

5. The combination with a harrow comprising a frame and a plurality of angularly adjustable disk gangs, of opposite, laterally extending, vertically movable members attached at one end to the frame and an auxiliary angularly adjustable disk gang mounted on the other end of each member and positioned ahead of and beyond the outer ends of the gangs on the frame.

6. The combination with a harrow comprising a frame and a plurality of angularly adjustable disk gangs, of opposite, laterally extending, vertically swinging members hinged to the central portion of the frame and projecting beyond the ends of the gangs, an auxiliary angularly adjustable disk gang mounted on the end of each member, and means for angularly adjusting each auxiliary gang about its vertical axis.

7. The combination with a harrow comprising a frame and a plurality of pivoted disk gangs, of opposite, laterally extending members hinged to the central portion of the frame and adapted to be raised into substantially vertical position, an auxiliary disk gang mounted on the end of each member and normally forming an extension of the first mentioned gangs, and means for retaining said members in raised position.

8. The combination with a harrow comprising a frame having a central forwardly extending portion and having a pair of disk gangs pivoted on the frame, of opposite laterally extending members hinged near the rear of said forwardly extending portion and projecting beyond the ends of the disk gangs, said members being positioned in the same vertical plane and adapted to be swung upwardly into substantially upright position, diagonal members connected to the outer ends of said laterally extending members and pivotally attached near the forward end of said central portion of the harrow frame, an auxiliary disk gang on the outer end of each laterally extending member and positioned beyond the end of each harrow gang, and normally forming an extension thereof and means for holding the laterally extending members in upright position at will.

9. A disk harrow comprising a central section including a plurality of angularly adjustable disk gangs, an outer section at each side of the central section and connected thereto for independent movement vertically, and an angularly adjustable disk gang on each outer section cooperating with the first named gangs to form extensions thereof.

10. A wide spread attachment for disk harrows of the type having pivoted gangs and a central draft tongue, said attachment comprising an auxiliary frame adapted to be attached at one end to the draft tongue of the harrow, a lateral extension on said frame projecting horizontally to a point beyond the outer end of one of the harrow gangs, a disk gang mounted on the outer end of said auxiliary frame on a vertical pivot, and means on the auxiliary frame for angularly adjusting said disk gang on its pivot.

11. A wide spread attachment for disk harrows of the type having pivotal gangs and a central draft tongue, said attachment comprising a draft member adapted for connection to the harrow tongue, a frame composed of divergent bars attached at their spread ends to the draft member with their connected ends extending to a point beyond one of the harrow gangs, a disk gang mounted on the bars at their connected ends on a vertical axis, and gang adjusting means carried on said bars and connected to the gang.

12. A wide spread attachment for disk harrows of the type having pivoted gangs and a central draft tongue, said attachment comprising auxiliary frame members adapted to be pivotally connected to the harrow tongue to project horizontally and laterally from each side of the tongue to a point beyond the harrow gangs, and angularly adjustable auxiliary gangs mounted on the outer ends of said members and adapted to extend the effective width of the harrow.

In testimony whereof I affix my signature.

SHERMAN W. CADY.